(12) United States Patent
Gurgov

(10) Patent No.: US 10,419,688 B2
(45) Date of Patent: Sep. 17, 2019

(54) ILLUMINATING A SCENE WHOSE IMAGE IS ABOUT TO BE TAKEN

(71) Applicant: INUITIVE LTD., Ra'anana (IL)

(72) Inventor: Hassid Costa Gurgov, Or Akiva (IL)

(73) Assignee: INUITIVE LTD., Ra'anana (IL)

(*) Notice: Subject to any disclaimer, the term of this patent is extended or adjusted under 35 U.S.C. 154(b) by 117 days.

(21) Appl. No.: 15/391,234

(22) Filed: Dec. 27, 2016

(65) Prior Publication Data

US 2017/0187942 A1    Jun. 29, 2017

Related U.S. Application Data

(60) Provisional application No. 62/271,398, filed on Dec. 28, 2015.

(51) Int. Cl.

| | |
|---|---|
| *H04N 7/18* | (2006.01) |
| *G01S 17/36* | (2006.01) |
| *G01S 17/89* | (2006.01) |
| *G06T 7/521* | (2017.01) |
| *H04N 5/235* | (2006.01) |
| *H04N 5/225* | (2006.01) |
| *H04N 13/204* | (2018.01) |
| *G06K 9/00* | (2006.01) |
| *G06K 9/20* | (2006.01) |

(52) U.S. Cl.
CPC ....... *H04N 5/2354* (2013.01); *G06K 9/00201* (2013.01); *G06K 9/2036* (2013.01); *H04N 5/2256* (2013.01); *H04N 5/2351* (2013.01); *H04N 13/204* (2018.05)

(58) Field of Classification Search
CPC ......... H04N 5/235; H04N 13/02; G03B 15/03
USPC ............................................................. 348/46
See application file for complete search history.

(56) References Cited

U.S. PATENT DOCUMENTS

| | | | | |
|---|---|---|---|---|
| 9,137,511 | B1* | 9/2015 | LeGrand, III | ........ G06T 19/006 |
| 2007/0025717 | A1* | 2/2007 | Raskar | ................... G03B 15/03 |
| | | | | 396/155 |
| 2016/0057340 | A1* | 2/2016 | You | .................... H04N 5/23229 |
| | | | | 348/222.1 |

* cited by examiner

*Primary Examiner* — Patricia I Young
(74) *Attorney, Agent, or Firm* — Browdy and Neimark, PLLC

(57) ABSTRACT

An image capturing arrangement is provided which comprises a depth (3D) sensor, a processor, an illuminating device and one or more image capturing devices. The depth sensor is configured to acquire at least a partial representation of the scene whose image is about to be taken, the processor retrieves required information from the acquired representation about distances of objects included in that scene from the sensor, and the illuminating device is configured to provide a non-uniform illumination of the scene whose image is to be captured, based on the retrieved information.

8 Claims, 2 Drawing Sheets

ILLUMINATING A SCENE WHOSE IMAGE IS ABOUT TO BE TAKEN

TECHNICAL FIELD

The present disclosure generally relates to the field of illumination, and more particularly, to illumination of objects under widely varying conditions.

BACKGROUND

Brightness of object is the intensity of light per solid angle per unit area, which is emitted or reflected by that object. A known problem in the art is how to improve the conditions where artificial light is added while capturing an image, e.g. when applying flash light under dark conditions, where the amount of ambient light present is not sufficient to obtain a good-quality image.

When capturing images (video and/or pictures) the process results in different apparent brightness of the objects included in the images, wherein the brightness differences are a function of the distance that extends from the object to the image capturing device, reflectivity of the object, amount of light incident on the object as well as its orientation relative to camera. As an example, flash photography often results in overly bright faces, which are much closer to the camera than the rest of the scene.

In order to somewhat reduce this problem, photographers have special dedicated equipment such as special flash devices, which are designed to scatter light upwardly, rather than directly onto the object. Other known solutions are the use of arrangements having large screens and reflectors.

Also, special techniques may be applied in order to reach an arrangement of objects which avoids high differences in object brightness.

U.S. Pat. No. 4,304,479 to Polaroid corporation discloses a photographic camera having either a built-in or detachably connectable electronic strobe light which provides a preferred illumination distribution over the field of view of the camera in order to maximize flash range and improve the quality of illumination for flash pictures. The strobe is provided with a reflector that is asymmetrically shaped about the horizontal plane having optical power which decreases at different rates about the horizontal plane. This arrangement provides a vertically asymmetric distribution of illumination over the picture area with the peak illumination occurring at the central upper part of the picture area. Side to side illumination of the picture is generally symmetric about the vertical axis and is controlled by a reflector and a cylindrical Fresnel lens. However, this device cannot be automatically adjusted based on detailed information on the target whose image is being captured.

U.S. Pat. No. 7,670,032 which acknowledges the importance of uniform illumination, teaches as a solution the use of a diffuser-reflector assembly for use with a photographic flash lamp which may be installed onto the light-emitting end of a flash lamp and adjusted per image setup. It may comprise specular or diffuse reflectors, color or neutral density filters, or a combination. The frames and inserts of the device may be swung on its arms and independently pivoted over a wide range of angles above the lamp, thereby providing a wide range of lighting effects. Still, as referred to in the previous solution above, this publication also does not teach in any way applying an automatic method for carrying out local adjustments based on the scene, and does not reach the local resolution required.

High-dynamic-range imaging (HDRI or HDR) is a technique used in imaging and photography to reproduce a greater dynamic range of luminosity than is possible while using standard digital imaging or photographic techniques. Thus, HDR imaging may be employed to improve the visibility of dark (far) objects and at the same time to prevent saturation of bright (close) objects.

HDR images can represent a greater range of luminance levels than can be achieved using more traditional methods, such as many real-world scenes containing very bright, direct sunlight to extreme shade, or very faint nebulae. This is often achieved by capturing and then combining several different narrower range exposures of the same subject matter. Non-HDR cameras take photographs with a limited exposure range, resulting in the loss of detail in highlights or shadows. The two primary types of HDR images are computer renderings and images resulting from merging multiple low-dynamic-range (LDR) or standard-dynamic-range (SDR) photographs. HDR images can also be acquired using special image sensors.

Due to the limitations of printing and display contrast, acquiring an HDR image is only part of the solution. One must also apply appropriate methods for displaying the results. The method of rendering an HDR image to a standard monitor or printing device is called tone mapping. This method reduces the overall contrast of an HDR image to facilitate display on devices or printouts with lower dynamic range.

The present invention provides a new solution that enables overcoming the problem described above.

SUMMARY OF THE DISCLOSURE

The disclosure may be summarized by referring to the appended claims.

It is an object of the present disclosure to provide a method that enables to significantly improve results of photography (stills or video) by enabling to compensate for the object's distance within the scene.

It is an object of the present disclosure to provide a method that enables to significantly improve results of photography by preventing camera dazzling.

It is another object of the present disclosure to provide a method that enables to significantly improve results of photography by enabling to compensate for dark or tilted objects included in the target being captured.

Other objects of the present invention will become apparent from the following description.

As explained hereinbefore, when taking an image of a scene where some of its objects are close (e.g. a person's face) while other are farther (e.g. the background of a person), the close objects would typically appear too bright. Thus, according to the solution of the present invention, an adaptive system and a method for using same are provided in order to overcome this problem.

According to a first embodiment of the disclosure, there is provided an image capturing arrangement (e.g. an apparatus) which comprises at least one depth sensor, at least one processor, at least one illuminating device (e.g. a light generating flash, a projector, and the like) and one or more image capturing devices. The at least one depth sensor is configured to acquire at least a partial representation of the scene whose image is about to be taken (where the at least partial representation comprises retrievable information about depth, and optionally colors, associated with the scene), the at least one processor (which optionally may be a part of the at least one depth sensor) is configured to retrieve information from the acquired representation that concerns distances between objects included in the scene, from the at least one sensor, and wherein the illuminating device is configured to non-uniformly illuminate the scene whose image is to be captured, based on the retrieved information.

The term "scene" as used herein throughout the specification and claims, is used to denote a 3D space portion captured in an image and which includes objects located at different distances from an image capturing sensor (device). It may relate both to stills photography as well as to videos. The angle of view is the visible extent of the scene captured by the image sensor of the image capturing device, known as field of view "FOV". Wide angle of views capture greater portions of the space in front of an image capturing sensor, whereas small FOV leads to capturing smaller portions.

As will be appreciated by those skilled in the art, a 3D sensor is similar to a regular camera in the sense that it generates two dimensional matrix of numbers. Still, instead of associating color information with each of the pixels, the associated information represents distance of that pixel at the object, from the sensor (e.g. from the camera).

Therefore, once the 3D sensor's orientation is calibrated with the imaging camera, the distance may be provided by the 3D sensor for each pixel comprised in the image generated by the camera.

Typically, the information provided by the 3D sensor is a matrix of pixels with the value of depth associated with each of these pixels. In order to interpret this information as separate 3D objects, additional processing would be required (e.g. segmentation). For a large part of the examples described hereinbelow, this processing is not required but is optional. However, in the embodiments which involve the use of presetting of standard scenes, such as identifying the location of a surface (a face or a model's body) of a live object within the scene.

Although the depth related information is described hereinafter throughout the specification and claims as being retrieved from an image acquired by a 3D sensor, nevertheless, it should be understood that the present invention is not limited to this particular implementation and also encompasses cases where there are more than one sensor, e.g. two capturing devices that provide stereoscopic images, and the like.

According to another embodiment, the illuminating device is configured to provide the non-uniform illumination of the scene by adjusting the angular distribution of the illumination intensity.

In accordance with another embodiment, the non-uniform illumination of the scene comprises increased illumination intensity provided to objects included in the scene which are located at a farther distance from the image capturing arrangement than other objects included in that scene. Consequently the scene to be captured by the image capturing arrangement is illuminated to yield a desired object brightness distribution. By yet another embodiment, the at least one processor is configured to detect reflective objects comprised in the acquired three-dimensional representation of the scene.

In response to that detection, the at least one processor is configured to provide the illuminating device with information for reducing the illumination intensity that will be provided to the respective reflective (shiny) objects when the scene is captured by the image capturing device. This may be achieved for example, by reducing the illumination intensity at the direction where the reflective objects were detected.

According to another embodiment, the image capturing arrangement further comprises a sensor (e.g. a color camera) adapted to detect brightness and/or reflectiveness of surfaces that belong to human objects (e.g. faces or people), who are present within the scene whose image is about to be captured. For example, this additional sensor may be configured to capture a color image of same scene that is about to be captured, and the at least one processor is further configured detect bright and shiny objects, e.g. to distinguish faces (e.g. portraits) of human beings or animals from other objects included in the scene, and to enable adjusting locally the intensity of illumination accordingly.

In accordance with another embodiment, the illuminating device is further configured to emit light for non-uniformly illuminating the scene, while adjusting the spectrum of the emitted light (e.g. color temperature of the illumination). This embodiment may be used to achieve a more lively result, and one option to carry out this embodiment is by using 3-color LEDs which are configured to locally (i.e. for part of the scene) adjust not only the light intensity within the FOV but also illumination spectrum (e.g. color temperature) per LED source.

According to another aspect of the disclosure there is provided a method for obtaining an image of a scene that comprises both close objects (e.g. foreground objects) and far objects (e.g. background objects), wherein the method comprises the steps of:

acquiring at least a partial representation of the scene whose image is about to be taken;

retrieving information from the acquired representation, which relates to distances of objects included in that scene from a pre-determined reference point;

providing a non-uniform illumination of the scene whose image is to be captured, based on the retrieved information.

According to another embodiment, wherein the step of providing non-uniform illumination of the scene, comprises providing a variable angular distribution of the illumination intensity.

In accordance with another embodiment, the step of providing a non-uniform illumination, comprises increasing the intensity of the illumination provided to objects included in the scene which are located at a farther distance from a pre-determined reference point (e.g. the image capturing arrangement) than other objects included in that scene.

By yet another embodiment, the method further comprises the steps of:

detecting one or more reflective objects comprised in the acquired three dimensional representation of the scene; and generating information to enable adjusting the illumination intensity that will be provided to the one or more respective reflective objects when the scene is captured.

According to still another embodiment, the reduction in the illumination intensity is carried out by adjusting illumination intensity provided at the directions where the one or more highly-reflective objects were detected.

By yet another embodiment, the method further comprising a step of detecting brightness and/or reflectiveness of surfaces that belong to live objects (e.g. faces of humans) who are present within the scene whose image is about to be captured.

In accordance with another embodiment, the step of providing a non-uniform illumination of the scene whose image is to be captured, comprises emitting light while locally (i.e. by a different amount for each part of the scene) adjusting the illuminating light spectrum according to the acquired information.

BRIEF DESCRIPTION OF THE DRAWING

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details and that the invention is not limited to the scope of these examples.

Under certain conditions, especially when taking photographs at relatively close distances while using flash light, close objects appear overexposed (too bright), while far objects may appear too dark). The reason being that the amount of light received by the camera from an object when the latter is illuminated by a light source associated with the camera (e.g. a camera flash light), is inversely proportional to the camera-object distance squared. When illuminated by a source far away from the camera (e.g. the sun or streetlights), the brightness of the various objects included in an image, appears to be essentially similar. The solution provided by the present invention is primarily directed to solve the problem of brightness differences in an image when captured under poor light conditions and while using a light source located as part of or next to the image capturing arrangement (e.g. a camera).

Figure 1:
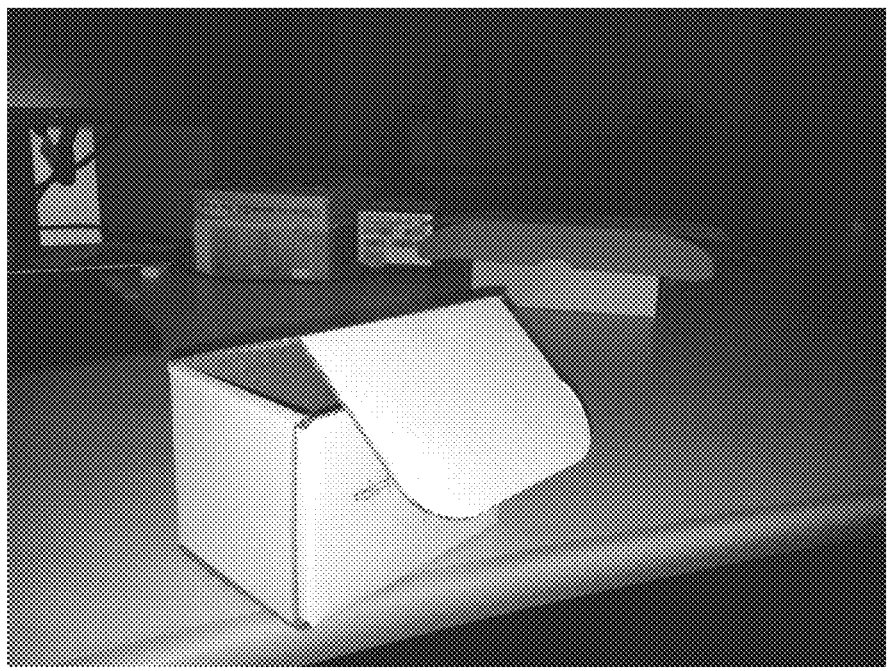
FIG. 1—is an example illustrating brightness difference between close and far objects.

An example demonstrating the effect of such capturing an image under such conditions is presented in FIG. 1. The table and the white box that appear at the foreground of the picture are relatively very bright, whereas the other objects located at the background of the picture, appear to be rather dark.

According to the solution provided by the present invention, acquiring information that enables constructing a depth map of the scene whose 2D image is about to be taken, allows the use of an adjustable illuminating device (e.g. a projector), which emits high intensity light at far objects and lower intensity light at closer objects.

In order to acquire the information which may then be used to construct the depth map, a depth sensor (or a 3D sensor) is used. There are various possible sensors known in the art per se that may be used, for example a stereo depth sensor, or one operating by implementing time-of-flight principle, and other types of sensors, all measure the distance from the sensor to objects in every single pixel.

The information retrieved from such a depth sensor comprises information on the distances of the various objects included within the scene to be captured by the image capturing arrangement, on a per-pixel basis. The information thus established, is then used to control the operation of the illuminating device. In the alternative, the information that will be used to control the operation of the illuminating device, is derived directly from the 3D sensor. For example, certain applicable 3D sensors may be configured to provide a frame (e.g. a matrix of pixels) in which each pixel value defines a distance from the object to which that pixel belongs to the image capturing device.

Figure 2:
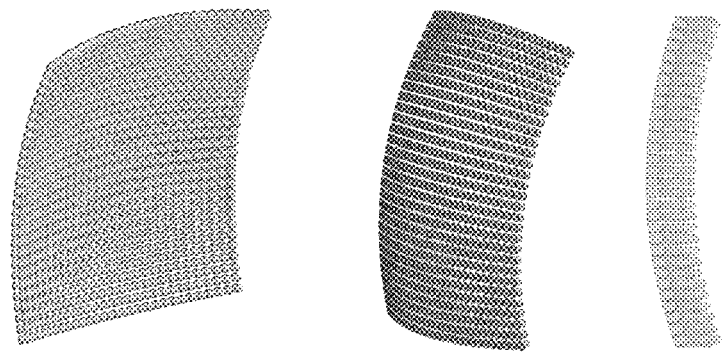
FIG. 2—is an example of an illuminating device of an image capturing arrangement construed according to an embodiment of the present invention.

An example of such an illuminating device, a projector in this example, is illustrated in FIG. 2, which presents three different views of the illuminating device. In this example projector comprises a 2D array of LED's, where each LED is directed at a different angle, when looking at a 2D cross-section. The LEDs are individually controlled during illumination, and the power provided to each LED for emitting light is proportional to the depth (distance) squared of the object segment towards which the LED is pointing (directed), thereby controlling the individual intensity of light at which each object of the scene is illuminated before the image is captured.

In addition to illumination for a single-image (still) photography, this above-described system may be used for video photography. For this type of operation, the components comprising the image capturing arrangement will preferably operate continuously under real time conditions and under open-loop control derived from the results obtained by the 3D sensor's, or under a closed-loop control, according to the results obtained when using a compact color camera which may be part of the 3D sensor.

Figure 3:
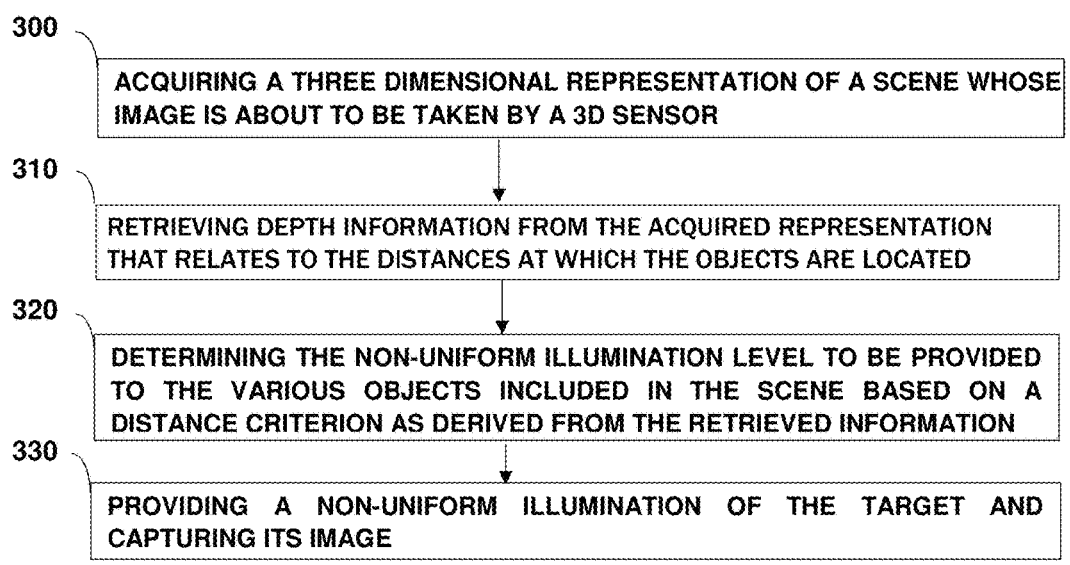
FIG. 3—is a flow chart exemplifying an embodiment of the present invention.

FIG. 3 is a flow chart exemplifying an embodiment of the present invention. In step 300, a three dimensional representation of the scene whose image is about to be taken is acquired, preferably by a 3D sensor.

Next, information is retrieved from the acquired three-dimensional representation (step 310). The retrieved information relates to relative distances between objects included in that scene, or to absolute distances of the objects included in that scene, with respect to a pre-determined reference point, e.g. the 3D sensor.

The information is then provided to a processor, which in turn instructs a controller of an illuminating device which, based on this information, to induce the illuminating device to emit light according to pre-defined conditions, for example, to emit light so that objects would be illuminated according to the user's presetting, for example, applying higher brightness for farther objects by a higher intensity light, whereas closer objects would be illuminated by a lower intensity light (step 320).

Once the scene is illuminated properly, the image is captured by an image capturing arrangement (step 330).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An image capturing arrangement, comprising:
   at least one depth (3D) sensor, at least one processor, at least one illuminating device and one or more image capturing devices, wherein:
   the at least one depth (3D) sensor is configured to acquire at least a partial three dimensional representation of the scene whose image is about to be taken;
   the at least one illuminating device comprises an array of a plurality of light sources;
   the at least one processor is configured to:
   retrieve information from the acquired three dimensional representation that concerns different distances extending between objects included within a single scene and said at least one depth (3D) sensor;
   detect one or more reflective objects comprised in the acquired three dimensional representation of the scene;
   provide the illuminating device with information for reducing the illumination intensity that will reach one or more reflective objects when the scene is captured by the image capturing device; and
   the illuminating device is configured to apply a non-uniform illumination of a scene whose image is to be captured by adjusting an angular distribution of an illumination intensity based on the retrieved information, wherein the reduction in the illumination intensity is carried out by reducing illumination intensity provided at directions where the one or more reflective objects were detected, and power provided to said plurality of light sources is controlled to enable controlling the individual intensity of the light at which the one or more reflective objects are illuminated before the image is captured.

2. The image capturing arrangement of claim 1, wherein the non-uniform illumination of the scene comprises increased illumination intensity provided to objects included in the scene which are located at a farther distance from the image capturing arrangement than other objects included in that scene.

3. The image capturing arrangement of claim 1, further comprising a sensor for detecting brightness and/or reflectiveness of surfaces that belong to live objects who are present in the scene whose image is about to be captured.

4. The image capturing arrangement of claim 1, wherein the illuminating device is further configured to emit light for non-uniformly illuminating the scene, while changing at least one portion of the emitted light spectrum.

5. A method for obtaining an image of a scene that comprises both close objects and farther objects, wherein the method comprises the steps of:
   acquiring at least a partial three dimensional representation of the scene whose image is about to be taken;
   detecting one or more reflective objects comprised in the acquired three dimensional representation of the scene;
   retrieving information from the acquired three dimensional representation, to enable reducing the illumination intensity that will be provided to one or more reflective objects when the scene is captured; and
   providing, based on the retrieved information, a non-uniform illumination of the scene whose image is to be captured by at least one illuminating device comprising a plurality of light sources,
   wherein said non-uniform illumination is provided by adjusting an angular distribution of an illumination intensity,
   wherein the reduction in the illumination intensity is carried out by reducing illumination intensity provided at directions where the one or more reflective objects were detected, and
   wherein power provided to said plurality of light sources is controlled to enable controlling the individual intensity of the light at which the one or more reflective objects are illuminated before the image is captured.

6. The method of claim 5, wherein the step of providing a non-uniform illumination, comprises increasing the intensity of the illumination provided to objects included in the scene which are located at a farther distance from a predetermined reference point than other objects included in that scene.

7. The method of claim 5, further comprising a step of detecting brightness and/or reflectiveness of surfaces that belong to live objects who are present within the scene whose image is about to be captured.

8. The method of claim 5, wherein the step of providing a non-uniform illumination of the scene whose image is to be captured, comprises emitting light while changing the spectrum of at least one portion of the emitted light.

* * * * *